US008650110B2

(12) United States Patent
Green

(10) Patent No.: US 8,650,110 B2
(45) Date of Patent: Feb. 11, 2014

(54) COUNTERFACTUAL TESTING OF FINANCES USING FINANCIAL OBJECTS

(75) Inventor: Omar Green, San Francisco, CA (US)

(73) Assignee: Intuit Inc., Mountain View, CA (US)

(*) Notice: Subject to any disclaimer, the term of this patent is extended or adjusted under 35 U.S.C. 154(b) by 0 days.

(21) Appl. No.: 13/443,098

(22) Filed: Apr. 10, 2012

(65) Prior Publication Data

US 2013/0238476 A1 Sep. 12, 2013

Related U.S. Application Data

(60) Provisional application No. 61/609,738, filed on Mar. 12, 2012.

(51) Int. Cl.
*G06Q 40/00* (2012.01)

(52) U.S. Cl.
USPC .................................. 705/36; 705/35; 705/37

(58) Field of Classification Search
USPC ................................................ 705/35, 37, 36
See application file for complete search history.

(56) References Cited

U.S. PATENT DOCUMENTS

| 7,680,717 B2 * | 3/2010 | Haig ........................... 705/36 R |
| 2009/0204529 A1 | 8/2009 | Warsaw et al. |
| 2009/0307088 A1 | 12/2009 | Littlejohn |

FOREIGN PATENT DOCUMENTS

JP 2009042813 2/2009

OTHER PUBLICATIONS

Barber et al.; "Once Burned, Twice Shy: Naive Learning, Counterfactuals, and the Repurchase of Stocks Previously Sold" Mar. 2004.*

* cited by examiner

*Primary Examiner* — Jagdish Patel
(74) *Attorney, Agent, or Firm* — Park, Vaughan, Fleming & Dowler LLP; Steven E. Stupp

(57) ABSTRACT

During a financial transaction, a functional representation of a financial history of a user is accessed. This functional representation specifies a financial output value based on input values and a behavioral pattern, and the behavioral pattern specifies a relationship between at least a pair of the variables associated with a dimension in the financial history. Then, the functional representation is modified based on a financial circumstance that is different than financial circumstances in the financial history. Moreover, the financial output value is calculated using the functional representation and the input values, and a modified financial output value is calculated using the modified functional representation and the input values. Next, the financial output value and the modified financial output value are compared. Based on the comparison and a testing metric, the electronic device determines a result of the counterfactual testing.

20 Claims, 11 Drawing Sheets

COUNTERFACTUAL TESTING OF FINANCES USING FINANCIAL OBJECTS

CROSS REFERENCE TO RELATED APPLICATIONS

This application claims priority under 35 U.S.C. § 119(e) to U.S. provisional patent application No. 61/609,738, entitled "Counterfactual Testing of Finances Using Financial Objects," by Omar Green, which was filed on 12 Mar. 2012, the contents of which are herein incorporated by reference.

This application is related to U.S. patent application Ser. No. 13/443,081, entitled "Improved Financial Outcome Based on Shared Financial Objects," by Omar Green, which was filed on 10 Apr. 2012; U.S. patent application Ser. No. 13/443,087, entitled "Generalized Financial Objects," by Omar Green, which was filed on 10 Apr. 2012; U.S. patent application Ser. No. 13/443,093, entitled "Determining Shopping Intent Based on Financial Objects," by Omar Green, which was filed on 10 Apr. 2012; and U.S. patent application Ser. No. 13/443,111 entitled "System for Dynamically Generating Financial Objects," by Omar Green, which was filed on 10 Apr. 2012, the contents of all of which are herein incorporated by reference.

BACKGROUND

The present disclosure relates to techniques for improving the financial outcome of individuals. More specifically, the present disclosure relates to a technique for testing the financial impact of alternative financial circumstances.

Consumers regularly make financial decisions that have consequences for their long-term financial well-being. For example, a consumer may decide when to pay a bill, whether or not to buy a product or a service (or, more generally, to spend money), and, if they choose to make a purchase, which financial vehicle (such as a credit or debit card) to use. Ideally, a given financial decision should be grounded in a rigorous analysis of the costs and benefits so that a consumer can make an optimal decision.

In practice, it is often difficult for consumers to analyze the consequences of their actions, let alone to make optimal decisions. In addition to the limits on available information, consumers usually do not have access to the necessary financial expertise or financial tools that they can use to perform a rigorous cost-benefit analysis. Furthermore, these enabling capabilities are often unavailable when a consumer is about to make a decision, such as when they are at the point of sale (for example, in a retail establishment).

As a consequence, consumers typically use their intuition to make financial decisions, and these financial decisions are often made quickly. This approach to decision-making usually is at odds with the more thoughtful, analytical approach described above, and may result in sub-optimal decisions that can adversely impact the consumer's finances and their long-term financial well-being.

SUMMARY

The disclosed embodiments relate to an electronic device that performs counterfactual testing. During operation, the electronic device accesses a functional representation of a financial history of a user, where the functional representation specifies a financial output value based on input values and a behavioral pattern, and the behavioral pattern specifies a relationship between at least a pair of the variables associated with a dimension in the financial history. Then, the electronic device modifies the functional representation based on a financial circumstance that is different than financial circumstances in the financial history. Moreover, the electronic device calculates the financial output value using the functional representation and the input values, and a modified financial output value using the modified functional representation and the input values. Next, the electronic device compares the financial output value and the modified financial output value. Based on the comparison and a testing metric, the electronic device determines a result of the counterfactual testing.

In some embodiments, the electronic device provides a recommendation to the user based on the result.

Note that the testing metric corresponds to: income, expenses, cash flow, and/or savings.

Moreover, modifying the functional representation may involve time shifting a sequence of payments or income events during a time interval. In addition, modifying the functional representation may further involve estimating an interest rate or another externally influencing variable (such as a macroeconomic variable) during the time interval.

Note that the functional representation may exclude the financial data in the financial history. Furthermore, the functional representation may include: an initial value, a sampling frequency, and/or a valid domain. A wide variety of functional dependencies, expressions and formats may be included in the functional representation. For example, the functional representation may include: fit parameters, a fit polynomial, a piecewise continuous function, and/or a closed-form expression. In some embodiments, the functional representation specifies a derivative of the financial output as a function of at least the one of the variables.

Moreover, the financial output value may include: income, expenses, cash flow, profit and loss, and/or savings. Alternatively or additionally, the financial output value may include a financial flow that contributes, during a time interval, to: income, expenses, profit and loss, cash flow, and/or savings.

Furthermore, the dimension may include time so that the relationship is based on temporal samples of the financial data. Alternatively, the dimension may be other than time.

Another embodiment provides a method that includes at least some of the operations performed by the electronic device.

Another embodiment provides a computer-program product for use with the electronic device. This computer-program product includes instructions for at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an electronic device, a technique for performing counterfactual testing, and a computer-program product (e.g., software) for use with the electronic device are described. During this technique (which we refer to as a "financial technique"), a functional representation of a financial history of a user is accessed. This functional representation specifies a financial output value based on input values and a behavioral pattern, and the behavioral pattern specifies a relationship between at least a pair of the variables associated with a dimension in the financial history. Then, the functional representation is modified based on a financial circumstance that is different than financial circumstances in the financial history. Moreover, the financial output value is calculated using the functional representation and the input values, and a modified financial output value is calculated using the modified functional representation and the input values. Next, the financial output value and the modified financial output value are compared. Based on the comparison and a testing metric, the electronic device determines a result of the counterfactual testing.

The financial technique may allow the user to make better informed and/or improved decisions (including financial and/or non-financial decisions). In particular, by transparently and securely representing aspects of the user's financial history (such as mathematical relationships and interrelationships, which are sometimes referred to as 'behavioral patterns'), the functional representation (which is sometimes referred to as a 'generalized financial object' or a 'financial object') may allow the user optimize their financial circumstances to achieve a desired financial objective. In the process, individuals may be able to bring analytical rigor to their financial decisions, which might otherwise be impulsive. Furthermore, by allowing the functional representations to be exchanged among individuals, the financial technique may allow the aggregate functional representations of at least some of the individuals to be used to improve their financial outcomes. Collectively, these aspects of the financial technique may allow it to be used to improve the financial outcomes or wellbeing of individuals, thereby enriching their lives. Therefore, the financial technique may increase consumer satisfaction, and may increase the revenue and profitability of a provider of the financial technique.

In the discussion that follows, a user or a consumer may include: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
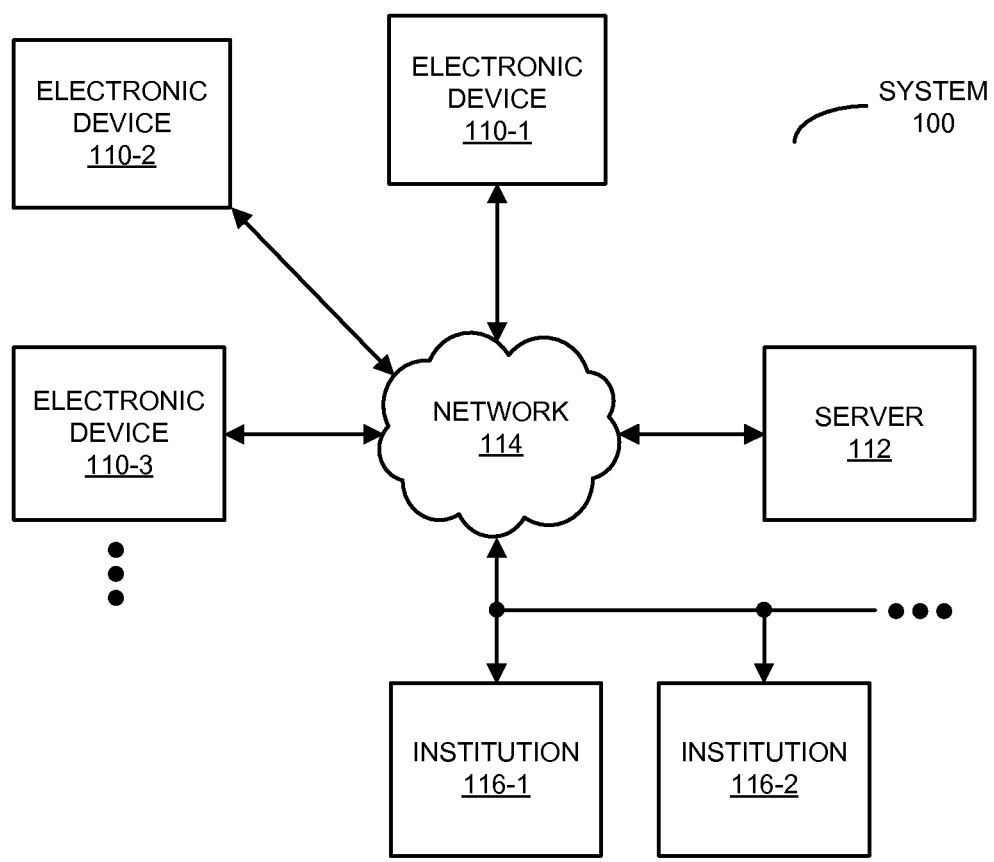
FIG. 1 is a block diagram illustrating a system that generates and uses generalized financial objects in accordance with an embodiment of the present disclosure.

We now describe embodiments of the system. FIG. 1 presents a block diagram illustrating a system 100. This system may provide an infrastructure that enables the sharing, via network 114, of: dynamic (possibly real-time) financial information among electronic devices 110 (such as cellular telephones) and with server 112; decisions or behaviors that drive the financial information (such as when bills are paid or when items are purchased); mathematical models of the financial information, behaviors or behavioral patterns, and/or decision-making (which are sometimes referred to as 'generalized financial objects,' 'functional representations' or 'financial objects'); and scenarios (which are sometimes referred to as 'alternatives') that can be the outcome of counterfactual testing against the financial information or the models of the financial information, decision-making or behaviors, with a goal of optimizing a user's finances to achieve one or more success factors or financial performance metrics (such as wealth acquisition). Note that in this discussion behavioral patterns are defined as representations of knowledge based on interrelationships between variables or factors in the financial information.

The financial information or data used to generate the functional representations, and thus to facilitate the aforementioned features, may be collected from: users of electronic devices 110 (for example, while the users use a financial software application); and/or institutions 116 (such as banks, credit card companies, government agencies, etc.). Thus, via network 114, electronic devices 110 may be inserted, directly or indirectly, into financial transaction flows so that the financial information can be collected.

By leveraging the insight and understanding embodied in the functional representations, system 100 may allow the users of electronic devices 110 to apply the financial information to modify behavior, such as when individuals spend money or how these individuals perceive their financial well-being. In the process, the capabilities in system 100 may allow the decision-making of the users to combine intuition (such as pattern recognition) and thoughtful calculation (i.e., analytical rigor), even in situations when the users or individuals are distracted or normally do not have access to analytical tools.

The financial software application on electronic devices 110 that helps implement these features is sometimes referred to as a 'mobile wallet worth having' or MWWH (i.e., an electronic wallet that you want to use). The MWWH may include a collection of software modules that help consumers have happier financial lives by: enabling financial transactions, improving skills and building happiness. Enabling financial transactions may involve providing mobile access to most sources of applicable financial funding, payment acceptance, and remittance services. This may include enabling the use of alternative or virtual stores of value (such as frequent flyer miles or gaming currencies) as funding sources. Moreover, improving skills may involve leveraging the financial and behavioral models (i.e., the functional representations) and/or counterfactual testing to calculate and present insightful information (actions, scenarios or alternatives) that a user of one of electronic devices 110 can use to improve their financial outcomes along a time scale, such as: real-time (when the users are or are about to spend or earn income), medium-term (for example, one or two years), and/or long term (for example, greater than two years). Furthermore, building happiness may involve leveraging the functional representations, insights, and alternatives by sharing this information. For example, when the functional representations are shared among electronic devices 110 via network 114, the MWWH executing on a given electronic device may perform calculations or comparisons based on the shared functional representations so that it can provide externally sourced insights and alternatives for a user, which the user may use when making decisions. Alternatively, when the functional representations are shared with server 112 or a search engine (which may be implemented in system 100 or externally to system 100), the shared functional representations can be treated as inputs when server 112 or the search engine performs its function.

As described further below with reference to FIG. 3, the functional representations may each be an 'object,' i.e., a software construct with one or more data structures, or with access to data structures or data sources. Such an object can be abstracted. It may have inheritance qualities. Moreover, it may support interfaces and access techniques. And it may embody polymorphism. In the present discussion, the functional representations may also include mathematical descriptions of financial data or behavioral data (which is sometimes referred to as 'contextual information') rendered as a model, e.g., a functional representation may include a data structure that embodies relationships between input variables and output variables or values (such as cash flow) over time, and which expresses relationships among the data within the model and/or between the data (e.g., the behavioral patterns). For example, a functional representation may be generated on a historical basis, for example, using spending of an individual or a user as a function of time.

In some embodiments, mathematical or statistical techniques are applied to the data. For example, one or more rows in a table (such as a spreadsheet) may represent an output for a particular week. When generating a functional representation, a string of weeks in the table may be fit to a formula. Thus, the functional representations may incorporate continuous or discrete relationships in the data. As noted previously, these relationships may include interrelationships between columns or rows in the table (and, more generally, between dimensions in a multidimensional space). As described further below with reference to FIG. 6, these behavioral patterns may be used to determine an emotional state of a user, such as their shopping intent. For example, a behavioral pattern may relate locations where an individual surfed the Internet and purchases in a financial transaction history. Subsequently, when the individual is browsing websites or conducting online searches, this behavioral pattern may be used to determine when and which marketing messages to provide to the individual to influence their imminent shopping behavior.

In some embodiments, the MWWH may be resident on and may execute on a given electronic device, such as electronic device 110-1. (Alternatively, the user may interact with a web page that is provided by server 112 via network 114, and which is rendered by a web browser on electronic device 110-1. For example, at least a portion of the MWWH may be an application tool that is embedded in the web page, and which executes in a virtual environment of the web browser. Thus, the application tool may be provided to the user via a client-server architecture.) This MWWH may be a standalone application or a portion of another application that is resident on and which executes on electronic device 110-1 (such as a software application that is provided by server 112 or that is installed and which executes on electronic device 110-1).

Note that information in system 100 may be stored at one or more locations in system 100 (i.e., locally or remotely). Moreover, because this data may be sensitive in nature, it may be encrypted. For example, stored data and/or data communicated via network 114 may be encrypted.

Figure 2:
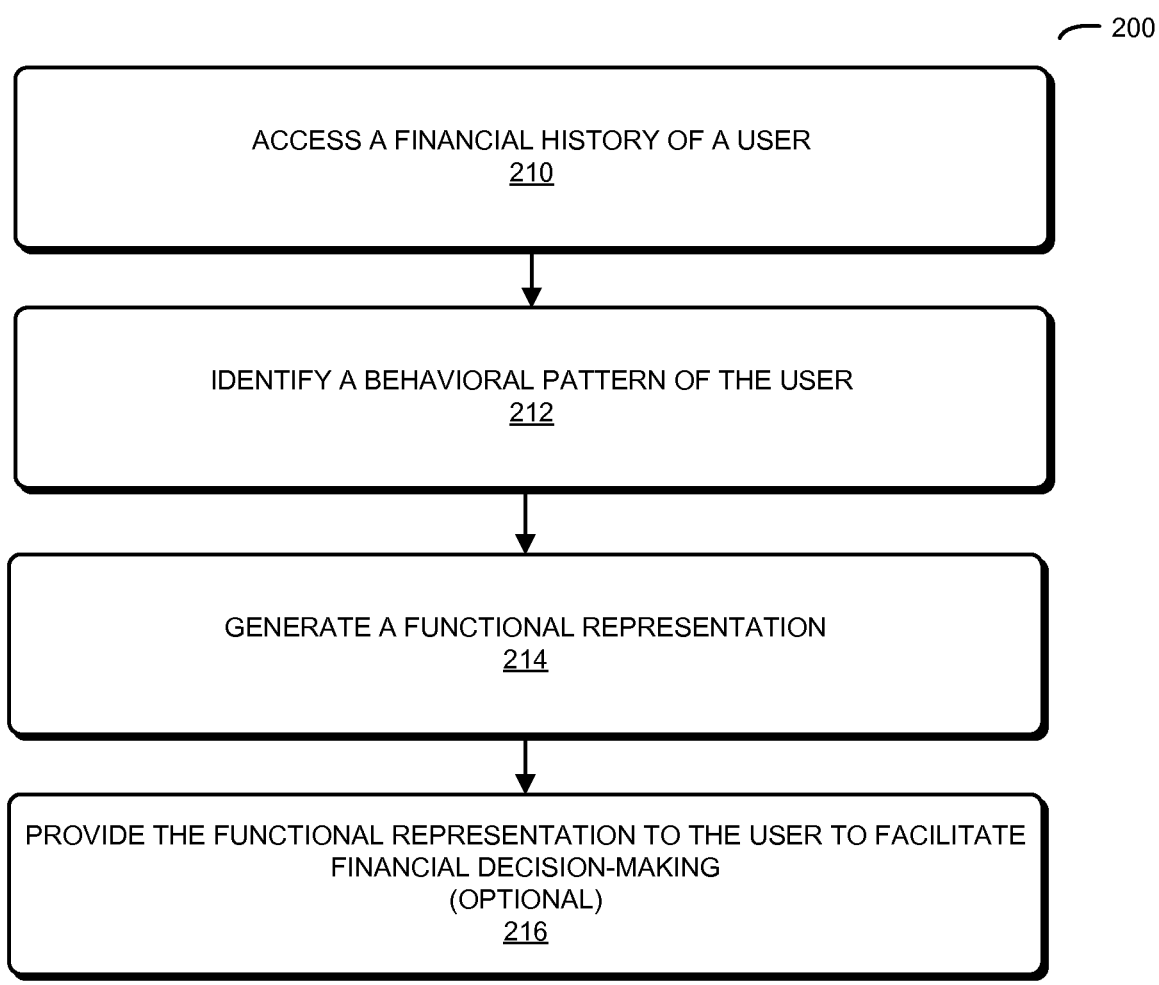
FIG. 2 is a flow chart illustrating a method for generating a functional representation of a financial history of a user in accordance with an embodiment of the present disclosure.

We now describe embodiments of the financial technique, which may be performed by a system (such as system 100), an electronic device (such as electronic device 900 in FIG. 9) in this system, and/or a computer system (such as computer system 1000 in FIG. 10) in this system. FIG. 2 presents a flow chart illustrating a method 200 for generating a functional representation of a financial history of a user. During operation, the electronic device accesses the financial history (such as a financial transaction history, a financial report and/or an income-tax return) of the user (operation 210), where the financial history includes financial data of the user over time, and the financial data includes multiple variables in a multidimensional space.

Then, the electronic device identifies a behavioral pattern of the user (operation 212) by determining a relationship between at least a pair of the variables along a dimension in the multidimensional space (i.e., an interrelationship). This dimension may include time so that the relationship is based on temporal samples of the financial data. Alternatively, the dimension may be other than time.

Moreover, the electronic device generates the functional representation (operation 214), which specifies one or more financial output values (which, in the remainder of the discussion, are used as illustrations of the one or more output values) based on input values and the identified behavioral pattern, where the input values include financial data for at least one of the variables.

Note that the functional representation may exclude the financial data in the financial history. Furthermore, the functional representation may include: an initial value, a sampling frequency, and/or a valid domain (i.e., valid values of the inputs). A wide variety of functional dependencies, expressions and formats may be included in the functional representation. For example, the functional representation may include: fit parameters, a fit polynomial, a piecewise continuous function, and/or a closed-form expression. In some embodiments, the functional representation specifies one or more derivatives of the output as a function of at least the one of the variables. Additionally, the functional representation may specify different financial output values based on the input values (e.g., multiple different financial output values may be determined from the input values using the functional representation).

Moreover, the financial output value may include: income, expenses, cash flow, profit and loss, and/or savings. Alternatively or additionally, the financial output value may include a financial flow that contributes, during a time interval, to: income, expenses, profit and loss, cash flow, and/or savings. For example, the financial output value may be an intermediate value or low-level value in a hierarchy that is ultimately used to determine: income, expenses, profit and loss, cash flow, and/or savings. Thus, the financial output value may include income from a client, which can be used to calculate the net income from multiple clients.

In some embodiments, the electronic device optionally provides the functional representation to the user to facilitate financial decision-making (operation 216).

Figure 3:
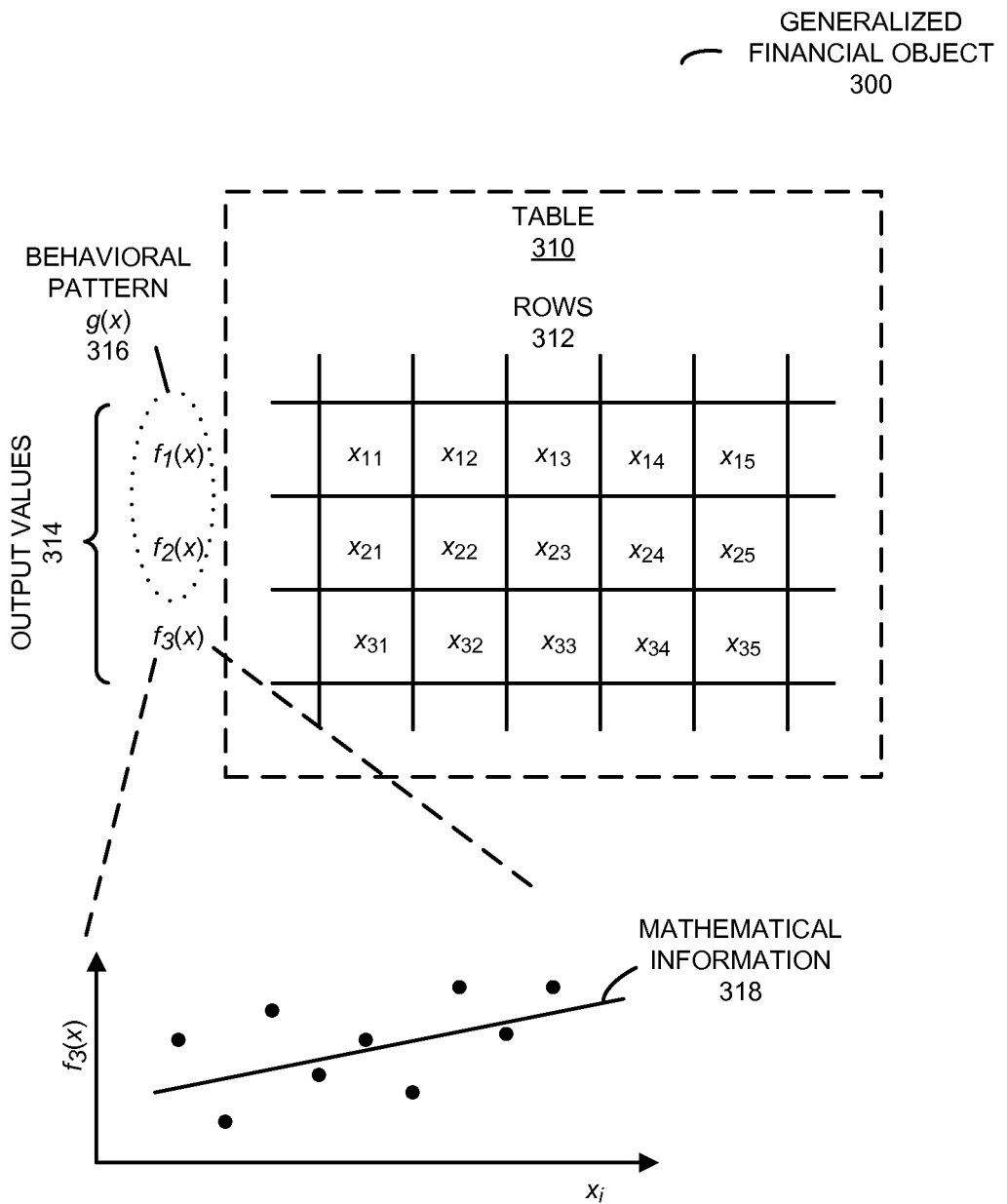
FIG. 3 is a drawing illustrating a generalized financial object in accordance with an embodiment of the present disclosure.

FIG. 3 presents a drawing illustrating a generalized financial object 300 (or a functional representation). In particular, generalized financial object 300 may describe or codify the relationship between data x in rows 312 of a table 310 and one or more financial output values f(x) 314. Thus, generalized financial object 300 may 'understand' the relationships in the data in a multidimensional space (including in a forward direction with future samples along a dimension or a reverse direction with past samples along the dimension). Alternatively or additionally, generalized financial object 300 may represent the interrelationships between two or more financial output values f(x), e.g., behavioral pattern g(x) 316 that incorporates relationships or contextual information between the data.

Generalized financial object 300 may include an optional header that includes: boundary conditions, an initial value, a sampling frequency (such as a temporal sampling rate), and/or a valid domain. Alternatively, the header may be separate from generalized financial object 300. Furthermore, generalized financial object 300 may include mathematical information 318, such as: fit parameters or coefficients, a fit polynomial, a closed-form expression, a piecewise continuous function, etc.

Note that generalized financial object 300 may exclude the data in table 310 that was used to determine generalized financial object 300. This data may be broader than financial data of a user. For example, the data may also include information, such as location(s) of the user, directions of travel, software applications the user is using or has used, documents the user has generated or has viewed (such as web pages or websites), a search history, a sequence of operations the user has performed during a task, etc.

Generalized financial object 300 may allow an individual's financial decisions to be optimized to maximize (or minimize) specific success metrics or financial performance metrics (such as the individual's net worth). Moreover, generalized financial object 300 may be adapted over time. For example, a user of the MWWH may optimize their financial decisions (and thus generalized financial object 300) trading off a financial performance metric and happiness. Therefore, generalized financial object 300 may be used to make user decisions more rigorous (and, in the process, to restrict the range of possible decisions).

In an exemplary embodiment, a behavioral pattern in generalized financial object 300 codifies an interrelationship in a dimension other than time in the multidimensional space (although, in other embodiments, the interrelationship may be between variables as a function of time). For example, the interrelationship may be based on physical location (i.e., in space) or a type of location. Thus, if an individual has previously eaten at a Mexican restaurant, this may specify the behavioral pattern that the individual likes Mexican food (as opposed to a specific Mexican restaurant).

In an exemplary embodiment, generalized financial object 300 specifies a cash flow statement. A cash flow statement may describe the financial relationship between inflows (I) into an account and outflows (O) as expressed by $$Cashflow = \sum_{t=t_1}^{t=t_2} I(t) - \sum_{t=t_1}^{t=t_2} O(t).$$

A model of a cash flow may render this formula across multiple inflows and outflows over time such that, in spreadsheet form, a column may represent each week that the formula was to be calculated and a row may represent each instance of an inflow or outflow. At the bottom of this spreadsheet, the cash flow balance for each week may be summarized. Cascading these summations into another row, the accumulation of funds from each week (week 1 feeding week 2, week 2 feeding week 3, and so on, until the data runs out) may be determined.

As noted previously, a functional representation, such as generalized financial object 300, may represent the mathematical relationships for the net cash flow balance or any of the lower-level or intermediate (weekly) cash flow balances in this hierarchy (i.e., a particular column). Thus, the data in this spreadsheet may be translated into a purely mathematical form, where the data in the individual cells of a row are treated as data points on a two-dimensional graph of value over time. In particular, the data points on this graph may be fit to a continuous or a discrete curve that can then be described with a mathematical formula. Moreover, a year-long cash flow spreadsheet with 52 weekly columns of inflows and outflows may be distilled into a single column of inflows and outflows, where for each time ($t_i$), the value of the cell is the output of a mathematical formula.

Thus, the inflows and the outflows in the preceding formula may be expressed as $$I(t) = P + \sum_{t=t_1}^{t=t_2} p(t)$$

and $$O(t) = Q + \sum_{t=t_1}^{t=t_2} q(t),$$

where p(t) and q(t) represent a mathematical formula that matches the curve of the data in each row over time, and P and Q represent the initial conditions or values for that row.

In this example, the data in the row has been replaced with a formula that can be used to calculate all the possible values of the data in each cell of that row. Note that, in order to specify these financial output values, in addition to the column of formulas for the inflows and outflows in the spreadsheet, a column with initial conditions of the generalized financial object 300 (i.e., values of the initial inputs at time $t_i$ or at some time along the rows) is needed to facilitate accurate calculations.

Once the data in the spreadsheet have been transformed into formulas, generalized financial object 300 may be used in a predictive way. For example, even though there may not be data for week 53, it can be calculated from the formula (s) used to calculate each cell. As described further below with reference to FIG. 7, this capability may be useful when performing counterfactual testing, but even within this example it may allow the user to input a week for which they have no data, and allow generalized financial object 300 to calculate the value of the cash flow balance.

By adding access mechanisms to supply this model of cash flow with real-time or historical data flows, and encapsulate it into an object-orientated design description of a software class, a financial object that can be exchanged between MWWHs and that can be used to facilitate user decision-making can be generated.

Building on this concept, access techniques for this financial object may be created that may allow it to calculate and output all its values over a period of time while being fed real-time data. Alternatively, two financial objects may be used to determine what the addition of one to the other would produce, or mathematical regressions may be performed on them.

Distilling individual data points into formula (s) also has the added advantage of obscuring the actual financial or behavioral data, which may enable the financial object to be shared with another electronic device without explicitly exposing the data. Similarly, this abstraction may be extended into another layer in which the explicit relationships between the rows are described by mathematical formula (s). In this hierarchy, generalized financial object 300 may require successive levels of calculation in order to produce the actual data in the individual cells, and thus the resultant financial output value(s).

Using this abstraction, generalized financial object 300 might allow a user to evaluate an online debt-consolidation offer. In particular, the user may provide generalized financial object 300 to a provider of the offer, thereby specifying the mathematical interrelationships of the user's financial data (and, thus, the user's financial circumstances). Then, the user could ask the provider to apply their debt-consolidation offer to them, and prove that their service delivers real value for the user.

Additionally, real-time analysis may be performed to determine 'behaviors' (which may represent an alternative definition of behavioral patterns) that can be inferred from the data in the cash flow model. Note that in this regard behaviors may include actions of the user that drive the data within the model. For example, first-order derivatives of each of the outflows over time may be computed to determine a 'speed' of spending (which is sometimes referred to as a 'spend velocity'). Similarly, a second-order derivative may determine the spend acceleration. Alternatively or additionally, note that additional measurements may be made on the inflow side to specify the income speed and/or the income acceleration.

Note that each of the aforementioned derivatives describes the rate of change within the data and also the rate of change of the user's behavior with respect to historical activity. For example, if the MWWH examined the spend velocity of the user's cash flow model and determined that the spend velocity had increased, and that the rate of increase was accelerating (positive spend acceleration), a user may be alerted to this behavior so that they have the option of correcting it. Alternatively or additionally, as described below with reference to FIG. 7, the MWWH can initiate a series of counterfactual financial tests against generalized financial object 300 to generate some alternatives (or alternative behaviors), which may assist the user in modifying their behavior.

Furthermore, note that the behaviors may not always be derived from the functional representation (as in the preceding example). In some embodiments, they may be determined or specified differently (such as by sensors that collect behavioral data for an electronic device during a financial transaction) and can be modeled in a different fashion with generalized financial object 300. In fact, a functional representation may contain both a model of financial inflows and outflows, and a separate (possibly related) model of behavior (or a behavioral pattern) that, for example, represents a user's location and telephone activity for each spending or income event. This behavioral pattern may also be used to predict and/or modify a user's behavior.

While the preceding cash flow model implements one type of mathematical representation, in other embodiments machine learning or supervised learning models may be used to determine a functional representation. These supervised learning models may, for example, include: a Bayesian statistical analysis technique, a rule-related technique, and/or a genetic analysis technique.

In another exemplary embodiment, the MWWH may allow an individual to track their net worth on a large spreadsheet. The spreadsheet may be designed as a kind of hybrid between a traditional net worth statement and a cash flow statement. The current funds within an account may be tracked within appropriate cells, and financial transactions may be captured within the cash flow part of the spreadsheet. Once a week (or so), the values in the accounts in the spreadsheet may be updated by the MWWH, and the subsequent calculations and/or the generation of the functional representation may occur without user action.

In particular, the functional representation may be determined as follows: for the cash flow, the inflows on that week may be summed, and the outflows may be subtracted. Then, for the balance sheet, the sum of the liabilities may be subtracted from the sum of the assets. In addition, the testing metric or the financial performance metric that may be used to optimize the functional representation (for example, via counterfactual testing) may be so-called 'escape cash.' Escape cash may be the sum of all of the individual's liquid assets (cash, stocks, bonds, etc.), divided by the three-month moving average of the individual's expenses. This financial performance metric may indicate to the individual how many months the individual could survive if they lost their job or if something catastrophic happened. As long as the escape cash is growing (for example, each month), the individual knows they are making progress. In general, a variety of financial performance metrics may be used to determine how a particular investment vehicle is performing and whether the individual is meeting their financial goals.

Figure 4:
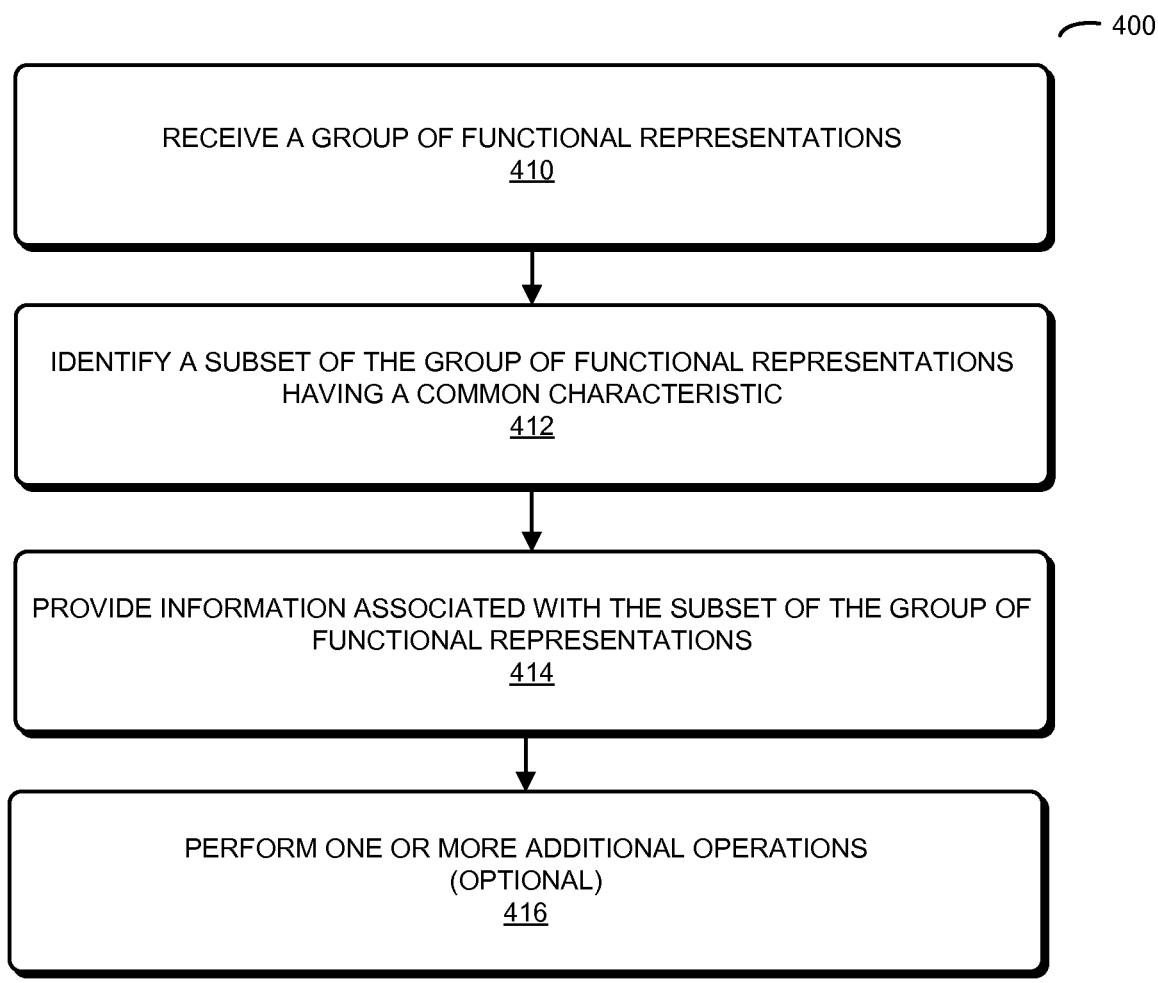
FIG. 4 is a flow chart illustrating a method for identifying financial histories of users having a common characteristic in accordance with an embodiment of the present disclosure.

We now describe several embodiments of the financial technique in which one or more functional representations are used to improve financial outcomes. FIG. 4 presents a flow chart illustrating a method 400 for identifying financial histories of users having at least a common characteristic. During operation, the electronic device receives a group of functional representations (operation 410) of financial histories of users from electronic devices, where a given functional representation specifies a financial output value based on input values.

Then, the electronic device identifies a subset of the group of functional representations having a common characteristic (operation 412). For example, the characteristic may include: a mathematical feature in the functional representations (such as an exponent, a derivative, an interrelationship or behavioral pattern between two variables in the financial histories associated with the subset, an abstract similarity based on a mathematical relationship, etc.), a financial performance metric associated with the functional representations (such as optimizing income, expenses, cash flow, profit and loss, and/or savings, and more generally, metrics that are functions of one or more of these parameters), input values, and/or a range of financial output values specified by the functional representations. For example, the common characteristic in the subset may include functional relationships having the same structure or mathematical forms for the relationships between rows and columns in a table or a spreadsheet.

In some embodiments, the electronic device optionally receives one or more financial performance metrics associated with the functional representations from the electronic devices (such as optimizing income, expenses, cash flow, profit and loss, and/or savings, and more generally, metrics that are functions of one or more of these parameters). Alternatively, the electronic device optionally calculates the financial performance metrics based on the functional representations. Then, the electronic device may calculate a supervised learning model based on at least the identified subset and the financial performance metrics. This supervised learning model may be used to identify the subset.

Moreover, the electronic device provides information associated with the subset of the group of functional representations (operation 414) to the electronic devices. For example, the information may specify an average functional representation of the subset. Alternatively, the electronic device may calculate variations on an average functional representation of the subset (such as different financial circumstances or counterfactual testing), where the information specifies the variations. These variations may facilitate optimization by the users of a financial performance metric associated with the average functional representation of the subset. Furthermore, as noted below, the information may provide feedback on dynamic shopping behavior of the users.

In some embodiments, the electronic device optionally performs one or more additional operations (operation 416). For example, the electronic device may couple the identified subset with a user behavioral model to generate a model of dynamic shopping intent, where the information specifies the model of dynamic shopping intent (such as a probability that the user will buy a product or a service within a subsequent time interval, e.g., an hour or a day). Additionally, the electronic device may: calculate a value of shopping intent of a user based on the model of dynamic shopping intent; and provide the value of shopping intent to a third party to facilitate marketing offers for the user.

Figure 5:
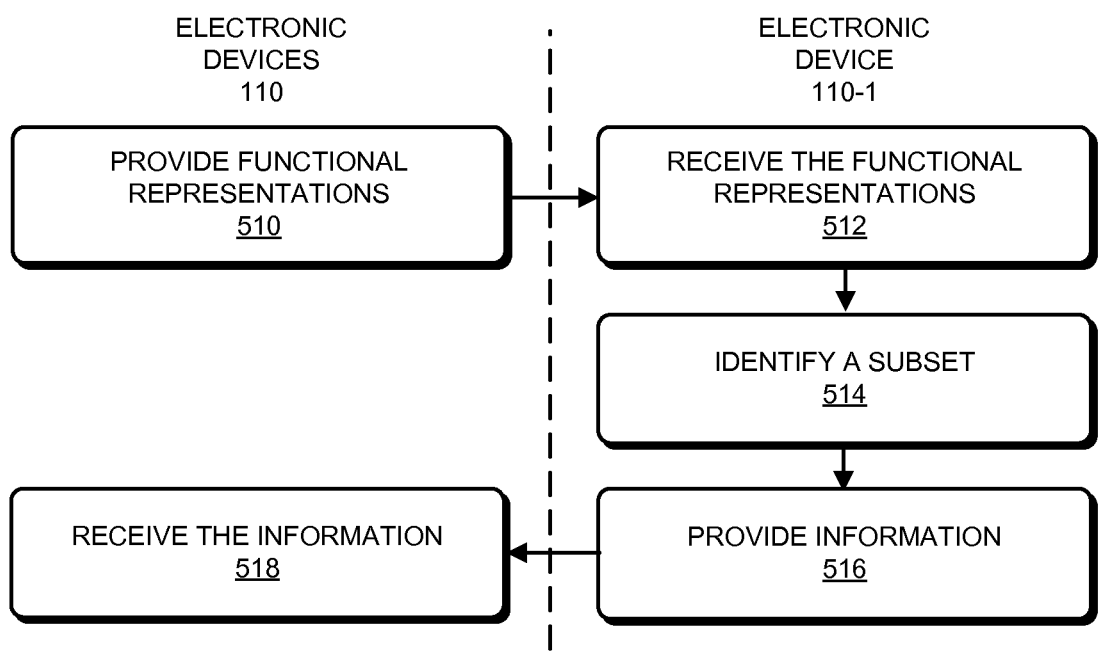
FIG. 5 is a flow chart illustrating the method of FIG. 4 in accordance with an embodiment of the present disclosure.

In an exemplary embodiment, method 400 is implemented using electronic devices that communicate through a network, such as a cellular-telephone network and/or the Internet (e.g., using a client-server architecture). This is illustrated in FIG. 5, which presents a flow chart illustrating method 400 (FIG. 4). During this method, users of electronic devices 110 may provide functional representations (operation 510) of financial histories. These functional representations may be received (operation 512) by a particular electronic device, such as electronic device 110-1.

Then, electronic device 110-1 identifies a subset (operation 514) of the group of functional representations having a common characteristic. Moreover, electronic device 110-1 provides information (operation 516) associated with the subset of the group of functional representations to electronic devices 110 (other than itself). These electronic devices may subsequently receive the information (operation 518).

In an exemplary embodiment, using object-oriented design techniques the users can share functional representations with one another. This sharing may allow the functional representations to be compared. For example, the MWWH may use collaborative filtering or a Bayesian statistical technique to identify clusters or subsets of functional representations that have common financial information or behaviors (and, more generally, a common characteristic). The identified subset may be consistent with a financial performance metric or success factor, such as maximizing savings.

For example, the functional representations may model cash flow. The common characteristic may include those functional representations corresponding to maximum savings or value in a financial account. In other embodiments, the common characteristic may include functional relationships having the same structure (or a similar structure, such as one that produces financial output values within 5, 10 or 20% of another functional relationship) in the models or the same (or similar) mathematical function representing the relationship(s) between rows and columns. Alternatively or additionally, the common characteristic may include the volatility (such as the standard deviation) of the amount of money in the financial account.

By sharing the functional representations, user behavior can be modified. For example, if the functional representations of three of your friends indicate that they did x and achieved y, a user may choose to emulate their financial approach or their decisions (such as to purchase a particular toothpaste to obtain a nice smile). Furthermore, because this information can be provided (via the MWWH) on a portable electronic device, it can influence the user's behavior at the point of decision. For example, the shared functional representation may be used to implement so-called 'tender shifting.' In particular, by sharing their functional representation with a merchant (and vice versa), a user may be able to determine which credit card (or financial vehicle) offers them the best financial outcome by considering: an existing balance, an interest rate, a merchant discount, frequent flyer miles, etc. In another example, the impact of an insurance policy on someone's long-term well-being can be determined. Functional representations from the perspective of the user (such as monthly payments, etc.) and the insurance agent may be exchanged and compared (or overlaid) to allow the user to see the financial impact and to make an informed decision.

To reduce the possibility of fraud when sharing functional representations (such as if someone exchanges a doctored functional representation), in some embodiments the aggregate norm of the functional representations may be determined to identify (and possibly exclude) outliers that deviate from normal behavior of the group of functional representations. Alternatively or additionally, the shared functional representations may be compared to a target. Furthermore, in some embodiments the shared functional representations may be provided to server 112 (FIG. 1), which may perform safety checks and flag (and possibly exclude) outliers.

In some embodiments, the shared functional representations are used for macroeconomic forecasting, for example, by a government agency. Alternatively or additionally, the shared functional representations may be used to assess the impact of a fiscal or monetary policy, or to modify user behavior (for example, by alerting the users to the consequences of a current or a planned fiscal or monetary policy).

In an exemplary embodiment, in addition to creating a financial object or a functional representation that specifies mathematical formulas and excludes the data, the functional representation can be further abstracted so that the initial conditions of the model are computed or are externally supplied. While these abstractions may partially protect the privacy of a user (and may make them more anonymous), additional operations such as traditional authentication and encryption may also be applied to further protect the identity of the user.

By sharing the functional representations, the users may obtain the benefits that come from sharing their financial relationships, and the behavioral patterns associated with them, without exposing their finances in a way that might embarrass or harm them. One of these benefits is learning new behaviors or alternatives by examining the financial output values determined using the functional representations of more successful users.

In some embodiments, the sharing of the functional representations facilitates a 'social' environment or network, in which the functional representations can be passed between users in the same way links to viral videos are 'shared' on existing social networks (for example, using a formatted hyperlink).

In this way, a collection of cash flow financial objects could have been mathematically combined with a collection of home-mortgage financial objects prior to the mortgage-backed-securities crisis of 2008 to help new home buyers determine that the U.S. was in the midst of a housing bubble because so-called 'dumb money' (i.e., those buyers who could not possibly have afforded their mortgages) was investing heavily in new mortgages. While the patterns of a bubble are well-understood conceptually, in the absence of a shared financial object, it may be difficult for a user to determine whether there is a bubble or not.

In some embodiments, the shared financial objects provide non-financial benefits, especially if the financial objects are compatible with the eXtensible Business Reporting Language (from XBRL International of New York, N.Y.), an XML language for describing business and financial data. In these embodiments, the financial objects could add levels of transparency to financial reporting by public corporations. Alternatively, they could be used to augment the credit score of a credit applicant by demonstrating a history of behaviors and changes to behavior.

Figure 6:
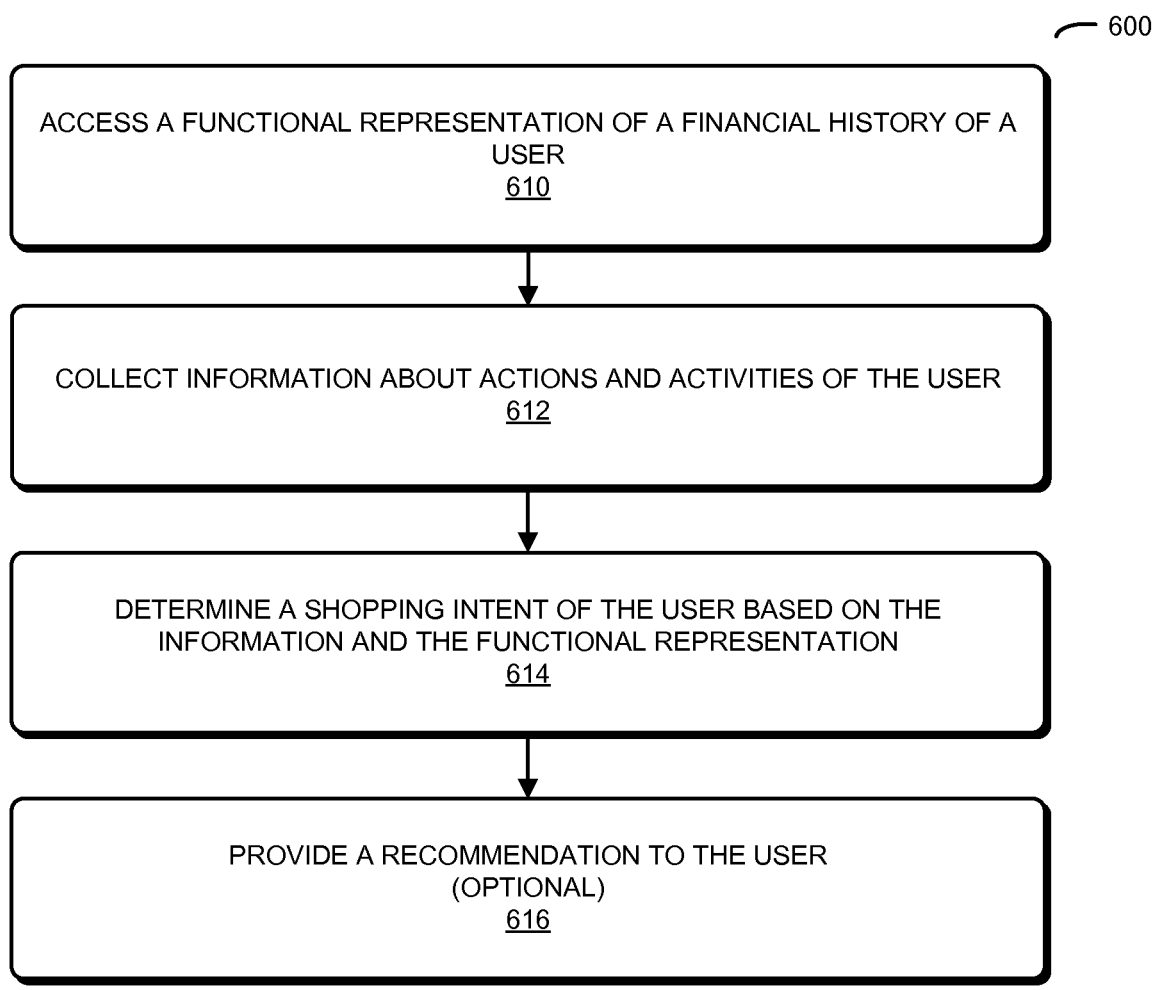
FIG. 6 is a flow chart illustrating a method for determining a shopping intent of a user in accordance with an embodiment of the present disclosure.

FIG. 6 presents a flow chart illustrating a method 600 for determining a shopping intent of a user. During operation, the electronic device accesses a functional representation of a financial history of the user (operation 610), where the functional representation specifies a financial output value based on input values and a behavioral pattern, and the behavioral pattern specifies a relationship between at least a pair of the variables associated with a dimension in the financial history. Then, the electronic device collects information about actions and activities of the user (operation 612), where the information corresponds to the behavioral pattern. For example, the actions may include financial transactions of the user and/or the activities may include locations of the user. Furthermore, the information may include current samples of at least one of the variables in the pair.

Moreover, the electronic device determines the shopping intent of the user based on the information and the functional representation (operation 614), where the shopping intent indicates a probability that the user intends to purchase an item (such as a product or a service) within a subsequent time interval (such as an hour or a day).

In some embodiments, the electronic device optionally provides a recommendation to the user (operation 616) related to the item based on the determined shopping intent. This recommendation may include one of: a discount on the item, an advertisement about the item, information about a provider of the item, information about the item, information about individuals who have used the item, information about individuals who have previously recommended the item, and/or information about a merchant that sells the item. Thus, the shopping intent may be used to influence user behavior.

In an exemplary embodiment, the behavioral pattern codifies a relationship between a history of physical or virtual locations of a user (such as websites or web pages that the user visited while surfing the Internet) and purchases in a financial transaction history. When the user of the MWWH is browsing websites or conducting online searches, this behavioral pattern may be used to determine when and which marketing messages to provide to the individual to influence their imminent shopping behavior.

Figure 7:
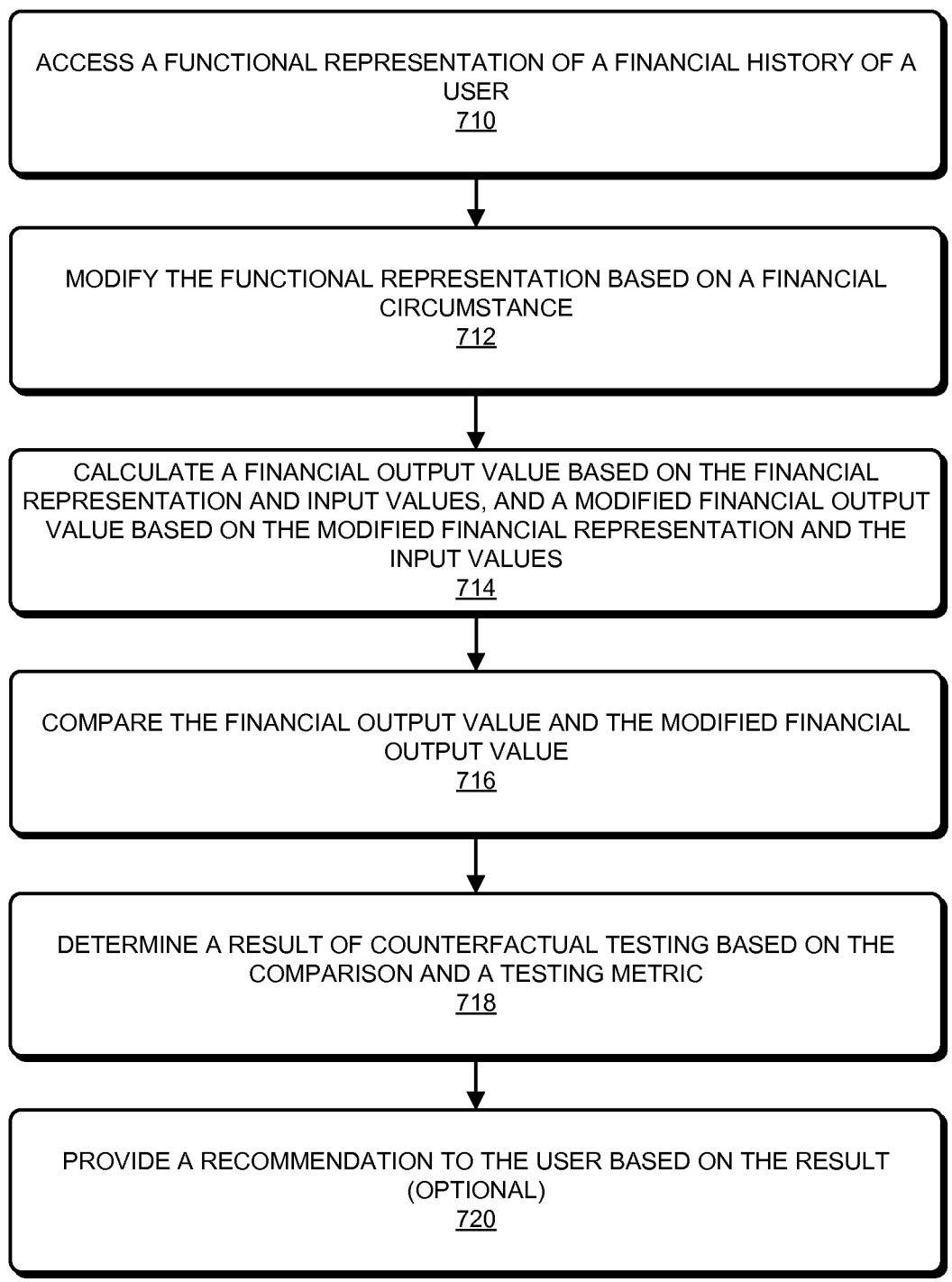
FIG. 7 is a flow chart illustrating a method for performing counterfactual testing in accordance with an embodiment of the present disclosure.

FIG. 7 presents a flow chart illustrating a method 700 for performing counterfactual testing. During operation, the electronic device accesses a functional representation of a financial history of a user (operation 710), where the functional representation specifies a financial output value based on input values and a behavioral pattern, and the behavioral pattern specifies a relationship between at least a pair of the variables associated with a dimension in the financial history. Then, the electronic device modifies the functional representation based on a financial circumstance (operation 712) that is different than financial circumstances in the financial history. For example, modifying the functional representation may involve time shifting a sequence of payments or income events during a time interval. In addition, modifying the functional representation may further involve estimating an interest rate or another externally influencing variable during the time interval. In general, a financial circumstance may include a value or a location (in space or time) of at least a datum in the financial history.

Moreover, the electronic device calculates a financial output value using the functional representation and the input values, and a modified financial output value using the modified functional representation and the input values (operation 714). Next, the electronic device compares the financial output value and the modified financial output value (operation 716). Based on the comparison and a testing metric, the electronic device determines a result of the counterfactual testing (operation 718). For example, the electronic device may indicate whether a particular counterfactual financial test improved a user's financial well-being as defined by the testing metric. Note that the testing metric may correspond to: income, expenses, cash flow, and/or savings. In particular, the testing metric may include maximizing income, cash flow and/or savings, or may include minimizing expenses. Therefore, the testing metric may be an instance or a type of a financial performance metric.

In some embodiments, the electronic device optionally provides a recommendation to the user based on the result (operation 720). For example, the electronic device may provide the recommendation to an electronic device used by the user, which displays the recommendation.

In the context of the functional representations (or financial objects) and the MWWH, counterfactual testing may be applied as a series of structural or mathematical alterations to one or more models (and, therefore, the relationships of the data within the models) to arrive at a set of alterations of the model or alternative behaviors that, when applied, satisfy some chosen success criteria or financial performance metric.

The counterfactual testing may be implemented by a series of structural alterations to a functional representation, which may be applied sequentially by a rule-driven software application that is embedded in the functional representation (or the financial object), or that is external to the functional representation. After each alteration, or series of alterations, the formula (s) may be evaluated, and an optimal value may be determined based on a success criteria or financial performance metric (such as maximum cash flow). Note that in a structural alteration, the formula for a row may be changed to reflect the condition (or financial circumstance) that the data that is represented by this formula has been changed, for example, due to a user decision, a change in behavior, or an external force (such as a change in an interest rate).

In an exemplary embodiment, counterfactual testing is performed on a functional representation of a cash flow statement. In these simulations, a payment (such as a bill payment) may be moved by a fixed amount, such as ±1 day, ±3 days or a month. For example, the impact of paying a cable bill this Tuesday (as opposed to next Tuesday) may be calculated. In particular, this variation may be applied systematically over a forecast interval (such as a year) and the financial impact (such as a change in savings) may be determined. In some embodiments, the impact of interest rates (or estimated interest rates) may be included in the forecast. In this way, statistical analysis can be performed on the varied functional representation(s) to optimize for a particular factor or variable (such as spend velocity).

In another exemplary embodiment, a user of the MWWH may have an increased spend velocity and a positive spend acceleration. In this example, the MWWH may call the rule-driven software application embedded in a financial object to run structural alterations to a mathematical model with the goal or financial performance metric of turning the spend acceleration negative, thereby slowing down the rate at which the spend velocity is increasing.

After this optimization, the MWWH may perform a similar analysis to bring the spend velocity to an acceptable level, such as the norm of the mathematical model. If this second process achieves a corresponding testing or financial performance metric, the MWWH may store the successful structural changes (including one or more alternatives) into a child financial object, and may then leverage this child financial object to create a set of alerts or cues to help steer the user toward behavior(s) that follows the results of those optimizations (assuming that the user previously consented to this kind of behavior modification).

Figure 8:
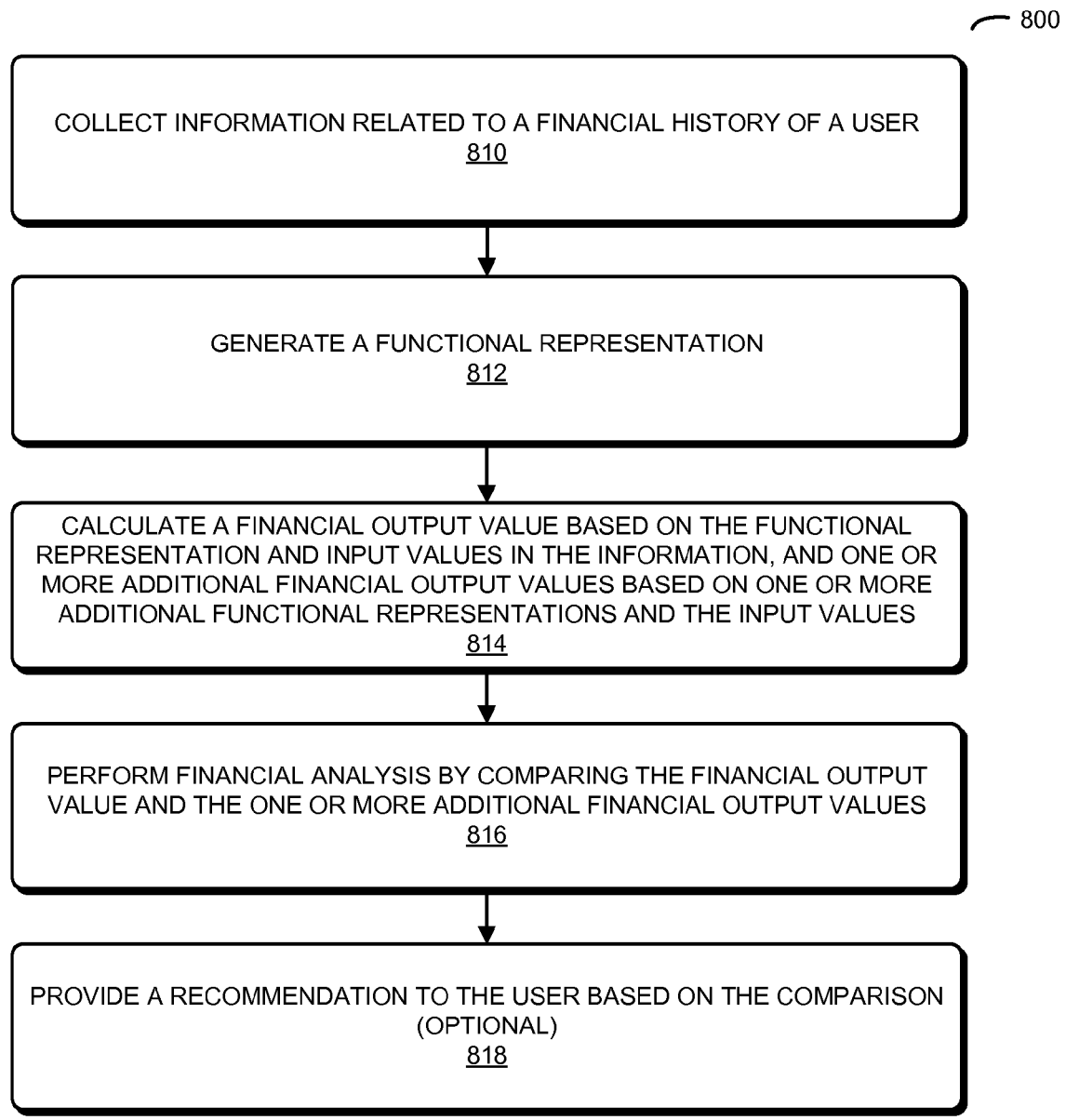
FIG. 8 is a flow chart illustrating a method for performing a financial analysis for a user in accordance with an embodiment of the present disclosure.

FIG. 8 presents a flow chart illustrating a method 800 for performing a financial analysis for a user. During operation, the electronic device collects information related to a financial history of the user (operation 810). This information includes financial data of the user over time, and the information specifies a behavioral pattern of the user that is defined by a relationship between at least a pair of the variables associated with a dimension in the financial history. Then, the electronic device generates a functional representation (operation 812) that specifies a financial output value based on input values and the behavioral pattern, where the input values include at least a portion of the financial data.

Moreover, the electronic device calculates, based on the financial data, a financial output value using the functional representation and input values in the information, and one or more additional financial output values using one or more additional functional representations and the input values (operation 814). Note that the one or more additional functional representations may be associated with one or more third parties that are different from the user. For example, the one or more third parties may provide a set of services, such as generating one or more additional functional representations. Alternatively or additionally, the one or more additional functional representations may be determined using counterfactual testing. This counterfactual testing may consider a financial impact of at least one financial circumstance that is different than financial circumstances in the financial history.

Next, the electronic device performs the financial analysis by comparing the financial output value and the one or more additional financial output values (operation 816). For example, the comparison may be graphical.

In some embodiments, the electronic device optionally provides a recommendation to the user on how to achieve a desired financial goal based on the comparison (operation 818).

In an exemplary embodiment, the MWWH collects data in real-time. The data may be collected from a financial and/or a behavioral (or behavioral pattern) standpoint. Then, functional representations may be generated using the collected data. In addition, models generated during counterfactual testing and/or models from third parties (such as external service providers or other users) may be received. These functional representations may be used to calculate output financial values, and the results may be compared (or overlaid) to achieve a goal as defined by a success factor or a financial performance metric (such as maximizing profits or savings). In this way, the financial technique may be used to illustrate the impact of modifications to the user's behavior.

Note that, when calculating the output financial values and/or when comparing the functional representations, a variety of mathematical transformations may be applied to the functional representations and/or the output financial values. For example, a discrete or a continuous transformation operation (such as a derivative or an integral operation) may be performed. Alternatively, the financial output values may be normalized or converted into relative values (instead of absolute values). The transformation(s) may be used to facilitate the comparisons by the user by using a common format for the results.

In some embodiments of the methods in FIGS. 2 and 4-8, there may be additional or fewer operations. Moreover, the order of the operations may be changed, and/or two or more operations may be combined into a single operation. In some embodiments, one or more functions of the computer system are performed by the electronic device, and vice versa.

Figure 9:
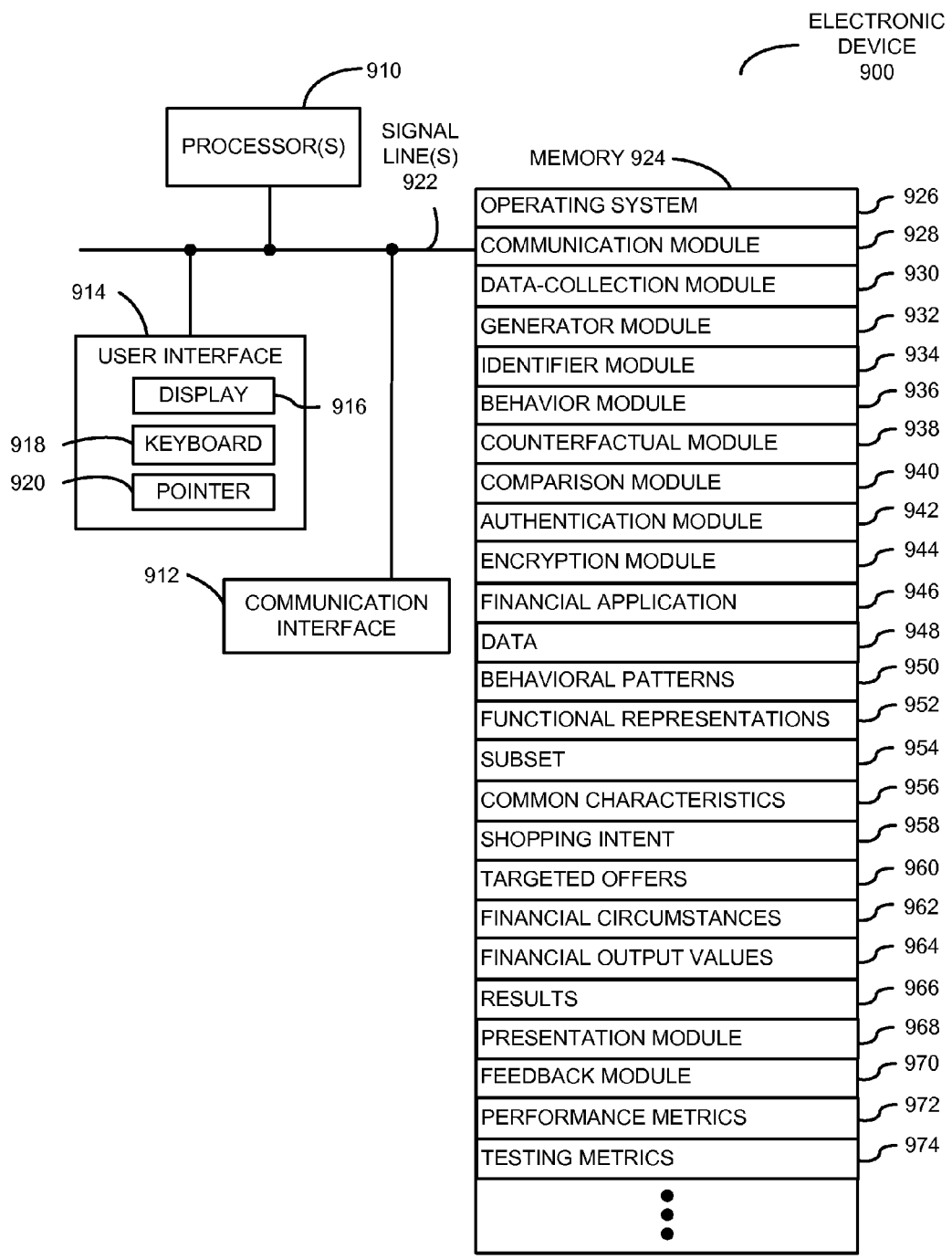
FIG. 9 is a block diagram illustrating an electronic device that at least in part performs the methods of FIGS. 2 and 4-8 in accordance with an embodiment of the present disclosure.

We now describe embodiments of the electronic device and the computer system, and their use. FIG. 9 presents a block diagram illustrating an electronic device 900 that performs at least a portion of one or more of the aforementioned methods, such as electronic device 110-1 (FIG. 1). Electronic device 900 includes one or more processing units or processors 910, a communication interface 912, a user interface 914, and one or more signal lines 922 coupling these components together. Note that the one or more processors 910 may support parallel processing and/or multi-threaded operation, the communication interface 912 may have a persistent communication connection, and the one or more signal lines 922 may constitute a communication bus. Moreover, the user interface 914 may include: a display or touchscreen 916, a keyboard 918, and/or a pointer 920, such as a mouse.

Memory 924 in electronic device 900 may include volatile memory and/or non-volatile memory. More specifically, memory 924 may include: ROM, RAM, EPROM, EEPROM, flash memory, one or more smart cards, one or more magnetic disc storage devices, and/or one or more optical storage devices. Memory 924 may store an operating system 926 that includes procedures (or a set of instructions) for handling various basic system services for performing hardware-dependent tasks. Memory 924 may also store procedures (or a set of instructions) in a communication module 928. These communication procedures may be used for communicating with one or more computers and/or servers, including computers and/or servers that are remotely located with respect to electronic device 900.

Memory 924 may also include multiple program modules (or sets of instructions), including: data-collection module 930 (or a set of instructions), generator module 932 (or a set of instructions), identifier module 934 (or a set of instructions), behavior module 936 (or a set of instructions), counterfactual module 938 (or a set of instructions), comparison module 940 (or a set of instructions), authentication module 942 (or a set of instructions), encryption module 944 (or a set of instructions), financial application 946 (or a set of instructions), presentation module 968 (or a set of instructions) and/or feedback module 970 (or a set of instructions). Note that one or more of these program modules (or sets of instructions) may constitute a computer-program mechanism. Furthermore, note that one or more of the modules in memory 924 may be included in the MWWH.

During operation of electronic device 900, data-collection module 930 may collect data 948. For example, data-collection module 930 may access data from numerous sources, including a financial history of a user of electronic device 900, via communication module 928 and communication interface 912. Alternatively or additionally, data-collection module 930 may monitor user behaviors, such as user actions and/or user activities (which may be monitored in real-time). For example, data-collection module 930 may monitor the location of electronic device 900 using communication module 928 and communication interface 912. In particular, the location may be determined based on interaction with a cellular-telephone network or a positioning system (such as the Global Positioning System). The resulting data 948 may include information as a function of time and may include multiple variables in a multidimensional space.

Then, generator module 932 may identify one or more behavioral patterns 950 in data 948 by determining a relationship(s) between at least a pair of the variables along a dimension in the multidimensional space. Moreover, generator module 932 may generate one or more functional representations 952 using data 948 and/or one or more of behavioral patterns 950. For example, functional representations 952 may be generated using: linear regression, nonlinear regression, a fit to a cubic spline, statistical analysis, a supervised learning technique (such as support vector machines or classification and regression trees), an unsupervised learning technique, a Fourier transform, integration, differentiation, etc. These functional representations may specify mathematical input-output relationships in data 948 and/or behavioral patterns 950. In addition, when generating functional representations 952, generator module 932 may abstract the mathematical relationships, and may include information (for example, in headers) and/or rule-driven modules that allow functional representations 952 to be exchanged with other electronic devices as financial objects or used to perform counterfactual testing.

The user of electronic device 900 may use one or more of functional representations 952 to facilitate financial decision-making, which may be based on one of performance metrics 972. For example, one or more functional representations 952 may be exchanged with other electronic devices using communication module 928 and communication interface 912. Security during this exchange may be facilitated by authentication module 942 (which may be used to restrict the recipients) and/or encryption module 944 (which may encrypt the functional representations 952). The received functional representations may be included with functional representations 952.

Then, identifier module 934 may identify a subset 954 of functional representations 952 that have one or more common characteristics 956. Furthermore, using communication module 928 and communication interface 912, electronic device 900 may provide information associated with subset 954 (such as an average functional representation of subset 954) to the other electronic devices.

Alternatively or additionally, behavior module 936 may determine a shopping intent 958 of the user based on data 948 and one or more of functional representations 952. For example, shopping intent 958 may be determined based on data 948 and one of behavioral patterns 950, which may be embedded or included in one of functional representations 952. Based on shopping intent 958, behavior module 936 may provide one or more targeted offers 960 (such as discounts or advertisements) to the user. These targeted offers may be presented to the user using display 916.

In some embodiments, counterfactual module 938 modifies one or more functional representations 952 based on one or more financial circumstances 962 (such as when bills are paid) that are different than the financial circumstances in data 948. Then, one or more financial output values 964 are calculated using the modified functional representations and input values in data 948, and the original functional representation(s) and input values in data 948. Counterfactual module 938 may compare the financial output values 964 for the modified and the original functional representations, and may determine one or more results 966 based on one or more testing metrics 974 and/or one of performance metrics 972. For example, results 966 may indicate which of the one or more financial circumstances 962 improve the user's cash flow or net savings.

In some embodiments, comparison module 940 may calculate financial output values 964 using one or more of functional representations 952 and input values in data 948. Then, comparison module 940 may perform financial analysis for the user by comparing the financial output values 964. This comparison may be graphic and, therefore, may be displayed on display 916.

Note that presentation module 968 may optimize the presentation of information associated with functional representations 952 to the user. In addition, feedback module 970 may learn, and thus may modify recommendations made to the user, based on the user's response to the recommendations (as evidenced by the user's subsequent behavior in data 948).

Because information in electronic device 900 may be sensitive in nature, in some embodiments at least some of the data stored in memory 924 and/or at least some of the data communicated using communication module 928 is encrypted using encryption module 944.

Figure 10:
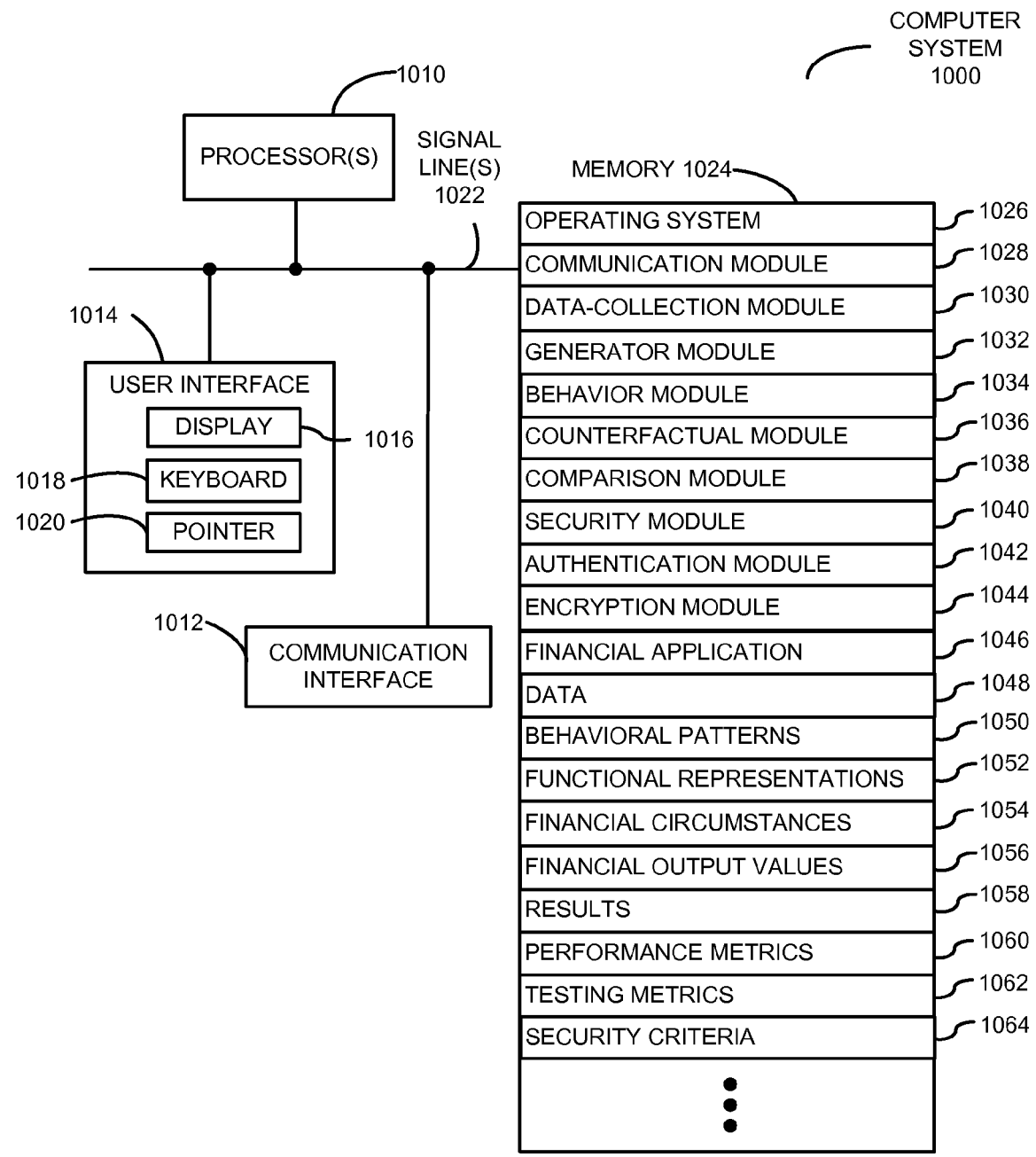
FIG. 10 is a block diagram illustrating a computer system that at least in part performs the methods of FIGS. 2 and 4-8 in accordance with an embodiment of the present disclosure.

FIG. 10 presents a block diagram illustrating a computer system 1000 that performs at least a portion of one or more of the aforementioned methods, such as server 112 (FIG. 1). Computer system 1000 includes one or more processing units or processors 1010, a communication interface 1012, a user interface 1014, and one or more signal lines 1022 coupling these components together. Note that the one or more processors 1010 may support parallel processing and/or multi-threaded operation, the communication interface 1012 may have a persistent communication connection, and the one or more signal lines 1022 may constitute a communication bus. Moreover, the user interface 1014 may include: a display or touchscreen 1016, a keyboard 1018, and/or a pointer 1020, such as a mouse.

Memory 1024 in computer system 1000 may include volatile memory and/or non-volatile memory. More specifically, memory 1024 may include: ROM, RAM, EPROM, EEPROM, flash memory, one or more smart cards, one or more magnetic disc storage devices, and/or one or more optical storage devices. Memory 1024 may store an operating system 1026 that includes procedures (or a set of instructions) for handling various basic system services for performing hardware-dependent tasks. Memory 1024 may also store procedures (or a set of instructions) in a communication module 1028. These communication procedures may be used for communicating with one or more computers and/or servers, including computers and/or servers that are remotely located with respect to computer system 1000.

Memory 1024 may also include multiple program modules (or sets of instructions), including: data-collection module 1030 (or a set of instructions), generator module 1032 (or a set of instructions), behavior module 1034 (or a set of instructions), counterfactual module 1036 (or a set of instructions), comparison module 1038 (or a set of instructions), security module 1040 (or a set of instructions), authentication module 1042 (or a set of instructions), encryption module 1044 (or a set of instructions) and/or financial application 1046 (or a set of instructions). Note that one or more of these program modules (or sets of instructions) may constitute a computer-program mechanism.

During operation of computer system 1000, data-collection module 1030, generator module 1032, behavior module 1034, counterfactual module 1036, comparison module 1038, authentication module 1042, and/or encryption module 1044 may perform similar functions to their counterpart modules in electronic device 900 (FIG. 9). For example, data-collection module 1030 may collect data 1048 from multiple sources. Moreover, generator module 1032 may determine one or more behavioral patterns 1050 in data 1048. Furthermore, generator module 1032 may use data 1048 to generate functional representations 1052. Additionally, authentication module 1042, and/or encryption module 1044 may be used when communicating data 1048 and functional representations 1052 with the electronic devices, such as electronic device 900. Thus, in some embodiments at least some of functional representations 1052 may be received from an external source, such as one of the electronic devices. Similarly, counterfactual module 1036 and/or comparison module 1038 may use or provide financial circumstances 1054, financial output values 1056, results 1058, performance metrics 1060 and testing metrics 1062.

Figure 11:
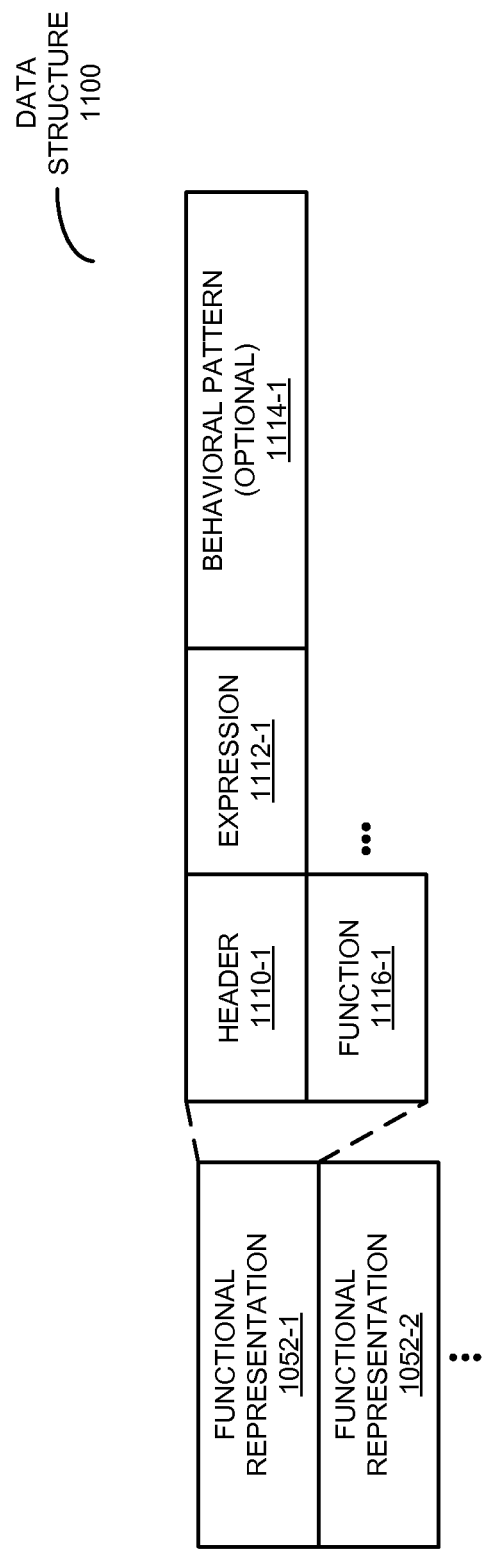
FIG. 11 is a block diagram illustrating a data structure for use in the electronic device of FIG. 9 or the computer system of FIG. 10 in accordance with an embodiment of the present disclosure.

Functional representations 1052 may be included in a data structure. This is shown in FIG. 11, which presents a data structure 1100. Functional representations 1052 may include information that specifies mathematical relationships in data 1048 (FIG. 10). In particular, functional representation 1052-1 may include: header 1110-1, information associated with an expression 1112-1 and/or a function 1116-1 that specifies the mathematical relationship, and/or an optional behavioral pattern 1114-1.

Referring back to FIG. 10, security module 1040 may be used to analyze functional representations 1052 to detect anomalous mathematical representations or fraud. For example, security module 1040 may compare functional representations 1052 to the norm. Deviations larger than one of security criteria 1064 may be flagged, and this information may be communicated to the electronic devices using communication module 1028 and communication interface 1012.

Because information in computer system 1000 may be sensitive in nature, in some embodiments at least some of the data stored in memory 1024 and/or at least some of the data communicated using communication module 1028 is encrypted using encryption module 1044.

Instructions in the various modules in memory 924 (FIG. 9) and memory 1024 may be implemented in: a high-level procedural language, an object-oriented programming language, and/or in an assembly or machine language. Note that the programming language may be compiled or interpreted, e.g., configurable or configured, to be executed by the one or more processors.

Although electronic device 900 (FIG. 9) and computer system 1000 are illustrated as having a number of discrete items, FIGS. 9 and 10 are intended to be functional descriptions of the various features that may be present in electronic device 900 (FIG. 9) and computer system 1000 rather than structural schematics of the embodiments described herein. In practice, and as recognized by those of ordinary skill in the art, the functions of electronic device 900 (FIG. 9) and computer system 1000 may be distributed over a large number of servers or computers, with various groups of the servers or computers performing particular subsets of the functions. In some embodiments, some or all of the functionality of electronic device 900 (FIG. 9) and computer system 1000 may be implemented in one or more application-specific integrated circuits (ASICs) and/or one or more digital signal processors (DSPs).

Electronic devices (such as electronic device 900 in FIG. 9) and computer systems (such as computer system 1000), as well as computers and servers in system 100 (FIG. 1) may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 114 (FIG. 1) may include: the Internet, World Wide Web (WWW), an intranet, a cellular-telephone network, LAN, WAN, MAN, or a combination of networks, or other technology enabling communication between computing systems.

In some embodiments one or more of the modules in memory 924 (FIG. 9) and memory 1024 may be associated with and/or included in a financial application, such as financial applications 946 (FIG. 9) and/or 1046. This financial application may include: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial application may be associated with and/or include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

System 100 (FIG. 1), electronic device 900 (FIG. 9), computer system 1000 and/or data structure 1100 (FIG. 11) may include fewer components or additional components. Moreover, two or more components may be combined into a single component, and/or a position of one or more components may be changed. In some embodiments, the functionality of system 100 (FIG. 1), electronic device 900 (FIG. 9), and/or computer system 1000 may be implemented more in hardware and less in software, or less in hardware and more in software, as is known in the art.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A method for performing counterfactual testing, comprising:
   at an electronic device, performing operations for:
      accessing a functional representation of a financial history of a user, wherein the functional representation specifies a financial output value based on input values and a behavioral pattern, wherein the behavioral pattern specifies a relationship between at least a pair of variables associated with a dimension in the financial history, and wherein the financial history comprises financial circumstances for the user, each of the financial circumstances comprising a value or a location for at least a datum in the financial history;
      modifying the functional representation based on a financial circumstance that is different than the financial circumstances in the financial history;
      calculating the financial output value using the financial representation and the input values;
      calculating a modified financial output value using the modified functional representation and the input values;
      comparing the financial output value and the modified financial output value; and
      determining a result for the counterfactual testing based on the comparison and a testing metric, wherein the result facilitates determining an effect of the financial circumstance on finances for the user.

2. The method of claim 1, further comprising providing a recommendation to the user based on the result.

3. The method of claim 1, wherein the testing metric corresponds to at least one of: income, expenses, cash flow, and savings.

4. The method of claim 1, wherein modifying the functional representation involves time shifting a sequence of payments or income events during a time interval.

5. The method of claim 4, wherein modifying the functional representation further involves estimating an interest rate or another externally influencing variable during the time interval.

6. The method of claim 1, wherein the functional representation excludes financial data in the financial history.

7. The method of claim 1, wherein the functional representation includes: an initial value, a sampling frequency, and a valid domain.

8. The method of claim 1, wherein the functional representation includes: fit parameters, a fit polynomial, a piecewise continuous function, and a closed-form expression.

9. The method of claim 1, wherein the financial output value includes one of: income, expenses, cash flow, profit and loss, and savings.

10. The method of claim 1, wherein the dimension is other than time.

11. The method of claim 1, wherein the result indicates whether the financial circumstance improves the finances for the user.

12. The method of claim 1, wherein the input values comprise financial data for the user.

13. A computer-program product for use in conjunction with an electronic device, the computer-program product comprising a non-transitory computer-readable storage medium comprising instructions that, when executed by a processor, perform a method for performing counterfactual testing, the method comprising:
   accessing a functional representation of a financial history of a user, wherein the functional representation specifies a financial output value based on input values and a behavioral pattern, wherein the behavioral pattern specifies a relationship between at least a pair of variables associated with a dimension in the financial history, and wherein the financial history comprises financial circumstances for the user, each of the financial circumstances comprising a value or a location for at least a datum in the financial history;
   modifying the functional representation based on a financial circumstance that is different than the financial circumstances in the financial history;
   calculating the financial output value using the financial representation and the input values;
   calculating a modified financial output value using the modified functional representation and the input values;
   comparing the financial output value and the modified financial output value; and
   determining a result for the counterfactual testing based on the comparison and a testing metric, wherein the result facilitates determining an effect of the financial circumstance on finances for the user.

14. The computer-program product of claim 13, wherein the method further comprises providing a recommendation to the user based on the result.

15. The computer-program product of claim 13, wherein the testing metric corresponds to at least one of: income, expenses, cash flow, and savings.

16. The computer-program product of claim 13, wherein modifying the functional representation involves time shifting a sequence of payments or income events during a time interval.

17. The computer-program product of claim 16, wherein modifying the functional representation further involves estimating an interest rate or another externally influencing variable during the time interval.

18. The computer-program product of claim 13, wherein the functional representation excludes financial data in the financial history.

19. The computer-program product of claim 13, wherein the financial output value includes one of: income, expenses, cash flow, profit and loss, and savings.

20. An electronic device, comprising:
   a processor;
   memory; and
   a program module, wherein the program module is stored in the memory and configurable to be executed by the processor to perform counterfactual testing, the program module including:
      instructions for accessing a functional representation of a financial history of a user, wherein the functional representation specifies a financial output value based on input values and a behavioral pattern,
   wherein the behavioral pattern specifies a relationship between at least a pair of variables associated with a dimension in the financial history, and wherein the financial history comprises financial circumstances for the user, each of the financial circumstances comprising a value or a location for at least a datum in the financial history;
      instructions for modifying the functional representation based on a financial circumstance that is different than the financial circumstances in the financial history;

instructions for calculating the financial output value using the financial representation and the input values;
instructions for calculating a modified financial output value using the modified functional representation and the input values;
instructions for comparing the financial output value and the modified financial output value; and
instructions for determining a result for the counterfactual testing based on the comparison and a testing metric, wherein the result facilitates determining an effect of the financial circumstance on finances for the user.

\* \* \* \* \*